J. Q. LOVELL.
HEATING SYSTEM FOR USE IN AUTOMOBILE GARAGES.
APPLICATION FILED FEB. 15, 1916.

1,234,049.

Patented July 17, 1917.
3 SHEETS—SHEET 1.

Witness
Edwin J. Beller.

Inventor
John Quitman Lovell,
by Wilkinson, Giusta &
MacKaye,
Attorneys.

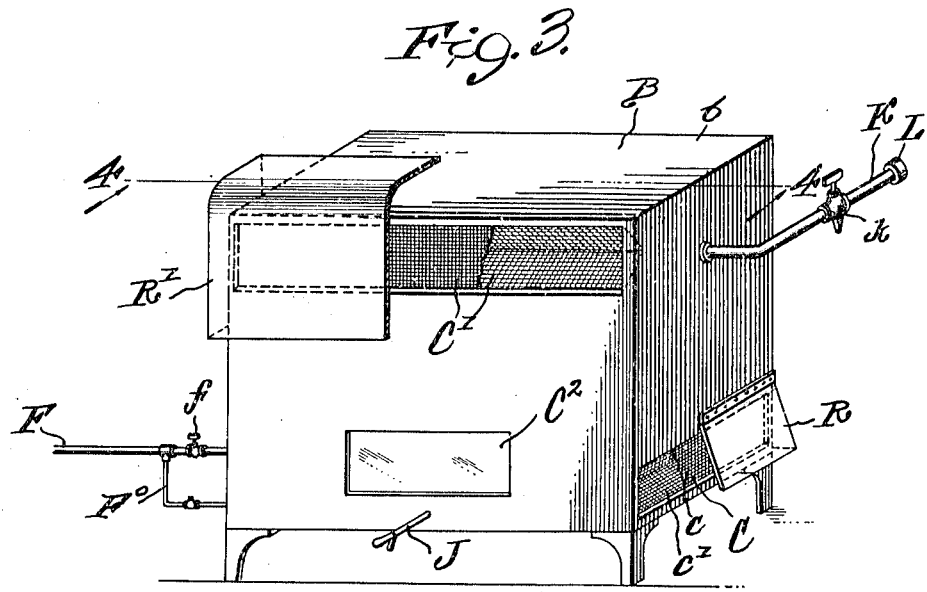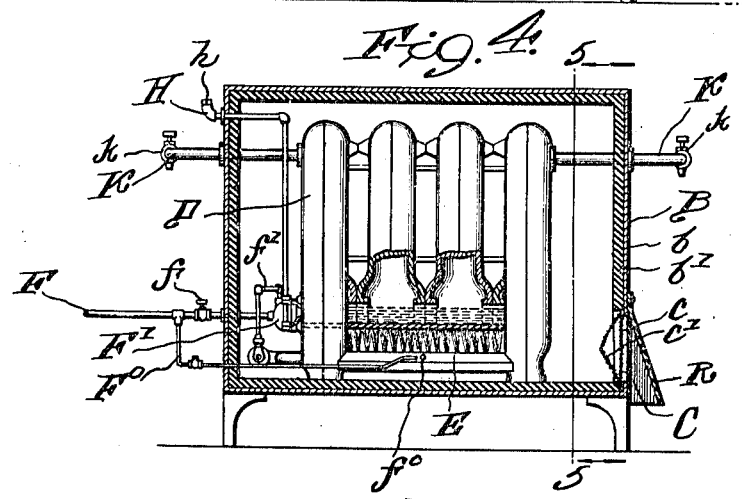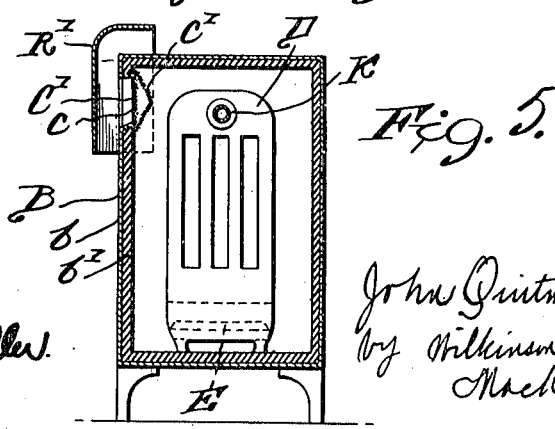

J. Q. LOVELL.
HEATING SYSTEM FOR USE IN AUTOMOBILE GARAGES.
APPLICATION FILED FEB. 15, 1916.

1,234,049.

Patented July 17, 1917.

Witness
Edwin J Beller

Inventor
John Quitman Lovell,
by Wilkinson, Guista & MacKaye,
Attorneys.

UNITED STATES PATENT OFFICE.

JOHN QUITMAN LOVELL, OF BALTIMORE, MARYLAND, ASSIGNOR OF ONE-THIRD TO WILLIAM STORROW LOVELL, OF BIRMINGHAM, ALABAMA, AND ONE-THIRD TO ANNE GORDON LOVELL, OF BALTIMORE COUNTY, MARYLAND.

HEATING SYSTEM FOR USE IN AUTOMOBILE-GARAGES.

1,234,049.   Specification of Letters Patent.   Patented July 17, 1917.

Application filed February 15, 1916. Serial No. 78,462.

*To all whom it may concern:*

Be it known that I, JOHN QUITMAN LOVELL, a citizen of the United States, residing at Baltimore, in the State of Maryland, have invented certain new and useful Improvements in Heating Systems for Use in Automobile-Garages; and I do hereby declare the following to be a full, clear, and exact description of the invention, such as will enable others skilled in the art to which it appertains to make and use the same.

My invention relates to improvements in heating systems for use in automobile garages, or other places where highly inflammable volatile liquids are used.

There has been great difficulty since the introduction of gasolene motors for automobiles in preventing the radiators containing water from freezing up, and also in preventing the engines from becoming so cold that it is difficult and often impracticable to start the same without providing some additional heating means. Difficulty is also experienced where the engines are not water cooled but air cooled.

Furthermore, automobiles should not be washed at an atmosphere near or below the freezing point for water.

The difficulty of providing auxiliary heating means is largely increased by the fact that insurance companies prohibit the use of open lights, or open stoves or fires in garages in which automobiles using gasolene are stored, owing to the fact that there is more or less leakage of the liquid, which evaporates, tending to cause explosions when an open light is used, or in any event greatly endangering the risk of fire.

This prohibits the use of the ordinary gas or oil burners in garages. Furthermore, attempts have been made to keep the hood and radiator warm by heating the whole body of the garage, but as this is generally a roughly built structure, with cracks to the doors, under the eaves, etc., it is both difficult and expensive to heat these properly, and often impossible.

According to my invention I provide a small gas burner which is mounted in a screened receptacle so arranged that the flame cannot be transmitted from the interior of said receptacle to the outside air, under the principle of the Sir Humphry Davy lamp; and above this burner I place a steam or hot water radiator, which is connected preferably by a flexible hose to a heating coil either temporarily placed in, or permanently located in the hood of the automobile around or in contact with the cylinders of the engine and the radiator of the machine. By this means the only part of the automobile that is injuriously affected by cold may be kept sufficiently warm, at the expenditure of a very small amount of heat, instead of requiring the heating up of the whole garage.

Moreover, in such garages as have a room for the chauffeur, the burner may be located in the chauffeur's room, and the hot air coming from same may be used to warm said room in the same manner as the ordinary gas stove, but without any danger from an open light.

My invention will be understood by reference to the accompanying drawings, in which:—

Fig. 3 is a perspective view, on a larger scale, showing the heater with its casing, and the pipes connected thereto;

Fig. 4 shows a vertical section through the casing containing the burner and radiator, the radiator being shown partly in elevation and partly broken away, and the section being shown along the lines 4—4 of Fig. 3, and looking in the direction of the arrows;

Fig. 5 shows a section along the line 5—5 of Fig. 4, and looking in the direction of the arrows;

Referring first to Figs. 1 to 5, which show the idea more or less diagrammatically, A represents the side walls of a garage which is provided with suitable doors $a$ at one end, and with an end wall $a'$ at the other. In rear of this end wall I have shown a room A' provided for the chauffeur, opening into the main body of the garage by the door $a^2$.

The heater is shown as mounted in the chauffeur's room, but may be mounted in any convenient point in the main body of the garage if desired.

B represents a suitable casing which may be of any desired shape, but I have shown it as rectangular in cross section and provided with an outer metal shell $b$, and an inner lining of asbestos, or other suitable heat insulating material $b'$. At one end of the casing, near its bottom, it is provided with an air inlet C, covered preferably by double wire screens spaced apart, and provided with a series of very fine perforations therein, and near the top of the casing I provide similar wire screens C' to carry off the hot air and the products of combustion.

I prefer to have the outer air inlet screen $c$ plane and the inner screen $c'$ V-shaped in cross section, leaving an air space between the two, and increasing the perforated surface of the inner screen. The air outlet screen C' is similarly arranged.

Both screens C and C' should preferably be protected by deflecting plates or hoods R and R', respectively, to prevent the possibility of any accident from the throwing of explosive liquid against the face of the screen.

In place of wire screens, perforated plates may be used if desired.

$C^2$ represents a suitable isinglass or mica panel, through which the operation of the burner may be inspected.

D represents a steam radiator of any suitable type, such, for instance, as the well known Clow construction, which is heated by a gas burner E also of any suitable preferred construction. This burner is fed with gas from the pipe F, controlled by the valve $f$, which gas flows through the chamber F', having a diaphragm so arranged that the supply of gas is automatically cut off when the pressure of the steam reaches a predetermined limit; but when not cut off the gas flows into the pipe $f'$ to the burners E.

This automatic cut-off arrangement, and also the automatic lighting arrangement for lighting the burner, are not a part of my present invention, but are well known in the art and will not be further described herein.

In addition to the usual pilot light $f^0$ I provide a by-pass $F^0$ connected thereto from the gas inlet pipe F. J (see Fig. 3) represents any suitable igniter.

Figure 2:
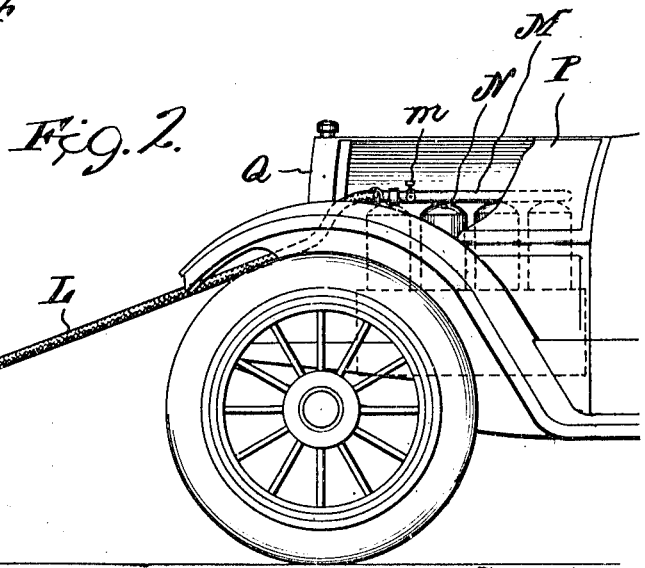
Fig. 2 is an end view of the heater, and a side view of the hood of one of the automobiles to which the heat is being applied.

The radiator D is supplied with water in any convenient way, as through the inlet pipe H, closed by the plug $h$, and the steam is carried off through one or more pipes K, controlled by the valves $k$. These pipes K are connected by the hose connections L to the steam coils M, which coils may be permanently located in the hood P of the automobile, or may be movable within a radius limit by the length of the hose, as shown in Fig. 2. These steam coils M are each provided with air scape valves $m$.

Each pipe K should be located at a lower level than the coil M, so that when the steam coil is in use in the automobile any water of condensation may run down the hose L and back through the pipe K into the radiator D.

The supply of heat from the coil M will not only keep warm the cylinders N of the engine, but will also keep the water from freezing in the radiator Q.

If it is desired to still further economize on heat, a blanket or robe may be thrown over the hood of the automobile after the steam is turned on.

Figure 1:
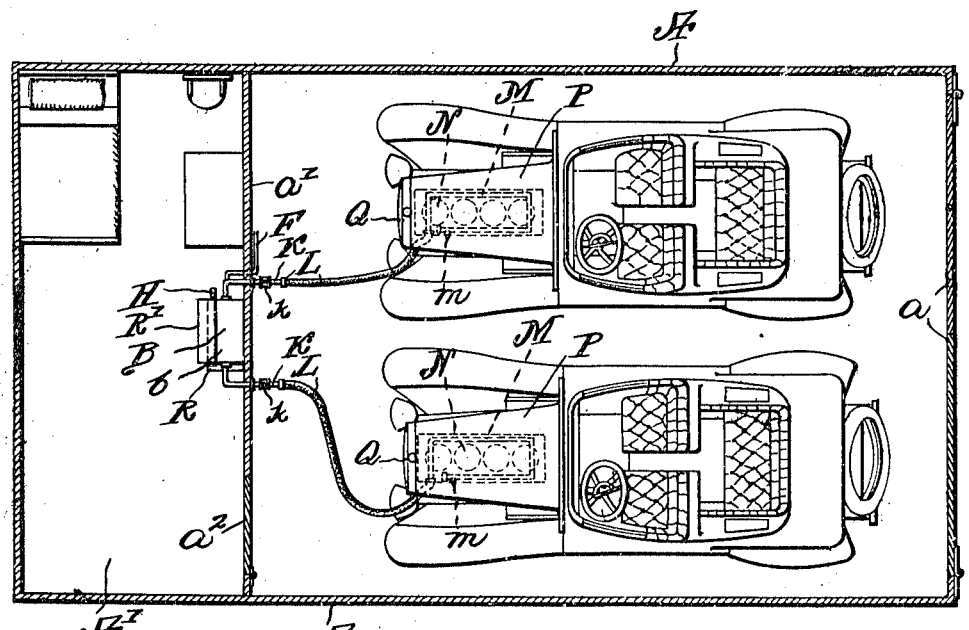
Figure 1 shows a section through the walls of a garage provided with the chauffeur's room at one end thereof, the heating system and automobiles being shown in plan.

By the arrangement shown in Figs. 1, 2 and 3, it will be seen that the cold air will enter the casing B through the screen C at one end thereof, and will flow out from said casing through the screen C' at the side thereof, out into the room A', thus warming the same; while the steam is carried through the pipes K and hose L direct to the hoods of the automobiles, thus warming the same without necessarily wasting much heat in warming up the body of the garage.

Figure 6:
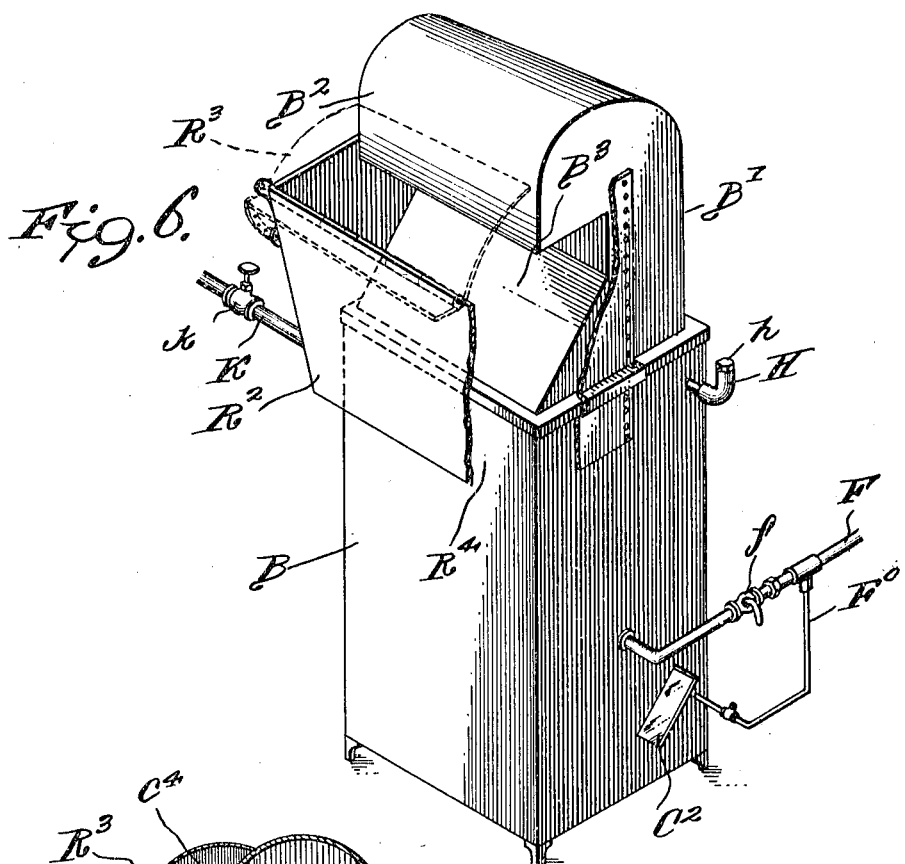
Fig. 6 is a perspective view showing an improved form of heater adapted for use in the herein described heating system, parts being shown as broken away.
Figure 7:
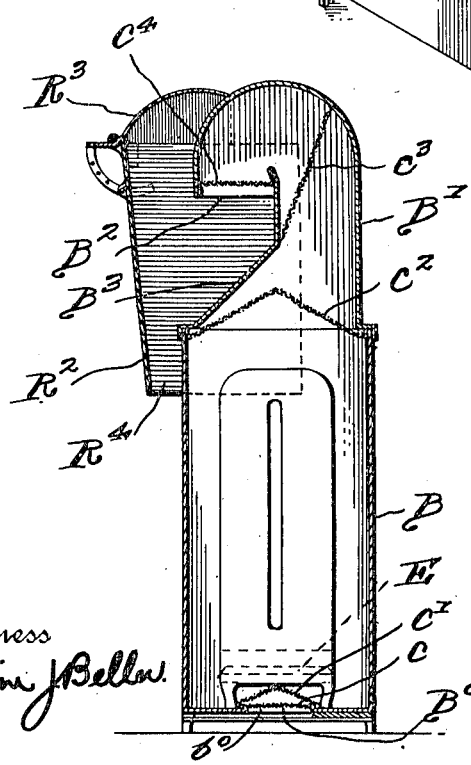
Fig. 7 shows a central vertical section of the heater shown in Fig. 6.

In the improved form of heater shown in Figs. 6 and 7, the bottom $B^0$ of the casing B is provided with an air inlet opening $b^0$ provided with an outer screen $c$, and an inner screen $c'$ preferably in the form of an inverted V, with an air space between the two.

The heated air and products of combustion pass upward through the inverted V-shaped screen $c^2$, then through the screen $c^3$ stretching across the neck B' of the casing, and finally passes out of the heater in a downward direction through the screen $c^4$ covering the orifice $B^2$ of the casing above the inclined face $B^3$. This screen $c^4$ not only serves to protect the interior of the casing from the insertion of explosive liquid, but also prevents the careless putting therein of rags, paper, or the like.

A hood $R^2$ may be added to the heater as an added protection against any inflammable liquid reaching the interior of the casing from being thrown by accident, or otherwise, against the inclined face $B^3$, or the screen $c^4$. This hood also serves to deflect the hot air and products of combustion from the heater.

With the hood I provide an adjustable hinged cover or damper $R^3$, shown in dotted lines in Fig. 6, and in full lines in Fig. 7, which serves to control the draft through the apparatus, and also directs, when desired, the heated air and products of combustion down through the passage R⁴ at the bottom of the hood R². This control of the draft will incidentally affect the amount of gas or other fuel used, since the supply is regulated by the steam pressure in the radiator.

Water is admitted through the feed pipe H closed by the plug h.

Gas is admitted through the pipe F to the burner, and through the by-pass F⁰ to the pilot light, not shown.

Steam is carried off by the pipe K and hose L.

While I prefer to use double screens spaced apart on account of the greater safety, especially should one screen be broken in any way, still single screens may be used if desired.

While I have shown the apparatus as arranged for warming up the engines of two automobiles, and at the same time warming the chauffeur's room, it will be obvious that one or more connections for carrying off the steam may be used, and that the heater may be located anywhere inside of the garage without there being any danger of accidents from fire.

In this method the application of the heat is confined to a very small area, and a very small quantity of fuel is required; while the hot air from the burners is not wasted but is used for heating up the chauffeur's room.

While the heating coil M is preferably permanently carried by the automobile, or made removable only in warm weather, it is obvious that one or more heating coils might be used which could be removed from the automobile each time the machine is taken out of the garage, and in such case the coil might remain attached to the flexible hose L and put in the hood of the machine when used and removed therefrom when desired.

The coil may be hung up on the wall, or placed at any convenient point and used as an ordinary heater. Thus when it is desired to warm up a garage sufficiently to wash an automobile without the water freezing, the steam coil may be hung on the wall, or placed near the automobile, and would be sufficient to warm the air enough for the purposes stated.

The herein described heating apparatus is also especially adapted for use in paint shops, dry cleaners' establishments, and other places where volatile inflammable substances are used.

Instead of supplying steam to the hoods of automobiles, a hot water system may be employed, if desired; but this would necessitate return pipes and other complications, which would be avoided by the single line steam pipe system shown.

It will be seen that there are three results combined in this heating system known to the art of heat engineering.

First, the heat from the Bunsen burners, well known in any gas stove.

Second, indirect heating by drawing air from outside the building, or within the building through the steam or hot water heated sections of a radiator, which is known to the art as "indirect radiation".

Third, steam heating in a supplementary radiator at a distance, by means of a flexible tube permitting of the radiator to be placed anywhere within the radius of the tube; thus, combining maxium economical efficiency, and distributing, by novel methods, all the possible heat units in the fuel used in this system.

It will be obvious that various modifications might be made in the herein described system, and the parts thereof, which could be used without departing from the spirit of my invention.

Having thus described my invention what I claim and desire to secure by Letters Patent of the United States is:—

1. A heating system for use in automobile garages comprising a gas burner and a steam generator mounted above the same, a casing inclosing said burner and generator and provided with a fine screen near the base for admitting cold air and with a similar screen near the top thereof for permitting the escape of the heated air, a pipe for conveying the heated fluid from said generator, a steam coil located in the hood of the automobile above the level of said pipe, and a flexible connection between said pipe and said coil adapted to return the water of condensation from said coil back to said generator, substantially as described.

2. A heating system for use in automobile garages comprising a gas burner and a steam generator mounted above the same, a closed casing inclosing said burner and generator and provided with a fine screen near the base for admitting cold air and with means for carrying off the products of combustion, a pipe for conveying the heated fluid from said generator, a steam coil located in the hood of the automobile above the level of said pipe, and a flexible connection between said pipe and said coil adapted to return the water of condensation from said coil back to said generator, substantially as described.

3. A heating system for use in automobile garages comprising a gas burner and a steam generator mounted above the same, a casing inclosing said burner and generator and provided with a fine screen near the base for admitting cold air and with a similar screen near the top thereof for permitting the escape of the heated air, means for automatically lighting the gas at said burner and within said casing, a pipe for conveying the heated fluid from the said generator, a steam coil located above the level of said pipe, and a flexible connection between said pipe and said coil, substantially as described.

4. A heating system for use in automobile garages comprising a gas burner and a steam generator mounted above the same, a closed casing inclosing said burner and generator and provided with a fine screen near the base for admitting cold air and with means for carrying off the products of combustion, means for automatically lighting the gas at said burner and within said casing, a pipe for conveying the heated fluid from said generator, a steam coil located in the hood of the automobile, above said generator, and a flexible connection between said pipe and said coil, substantially as described.

5. A heating system for use in automobile garages comprising a gas burner and a steam generator mounted above the same, a casing inclosing said burner and generator and provided with a fine screen near the base for admitting cold air with a similar screen near the top thereof for permitting the escape of the heated air, means for automatically lighting the gas at said burner and within said casing, means controlled by the pressure of the steam for regulating the supply of gas admitted to said burner, a pipe for conveying the heated fluid from the said generator, a steam coil located above the level of said pipe, and a flexible connection between said pipe and said coil, substantially as described.

6. A heating system for use in automobile garages comprising a gas burner and a steam generator mounted above the same, a closed casing inclosing said burner and generator and provided with a fine screen near the base for admitting cold air and with means for carrying off the products of combustion, means for automatically lighting the gas at said burner and within said casing, means controlled by the pressure of the steam for regulating the supply of gas admitted to said burner, a pipe for conveying the heated fluid from the radiator, a steam coil located in the hood of the automobile above the level of said pipe, and a flexible connection between said pipe and said coil, substantially as described.

In testimony whereof, I affix my signature.

JOHN QUITMAN LOVELL.